(12) United States Patent
Sato et al.

(10) Patent No.: US 7,332,242 B2
(45) Date of Patent: Feb. 19, 2008

(54) LITHIUM-BASED BATTERY HAVING EXTENSIBLE, ION-IMPERMEABLE POLYMER COVERING ON THE BATTERY CONTAINER

(75) Inventors: Takaya Sato, Chiba (JP); Hiroshi Yoshida, Chiba (JP); Zenzo Hashimoto, Tokyo (JP)

(73) Assignee: Itochu Corporation, Osaka-shi (JP)

( * ) Notice: Subject to any disclaimer, the term of this patent is extended or adjusted under 35 U.S.C. 154(b) by 1005 days.

(21) Appl. No.: 09/940,541

(22) Filed: Aug. 29, 2001

(65) Prior Publication Data

US 2002/0034685 A1 Mar. 21, 2002

(30) Foreign Application Priority Data

Sep. 1, 2000 (JP) ............................. 2000-265661

(51) Int. Cl.
*H01M 2/02* (2006.01)
(52) U.S. Cl. ..................... 429/163; 429/153; 429/176
(58) Field of Classification Search .................. 429/94, 429/163, 176, 185, 149, 152, 153
See application file for complete search history.

(56) References Cited

FOREIGN PATENT DOCUMENTS

| JP | 10-208708 | * | 8/1998 |
| JP | 10-208708 A | | 8/1998 |
| JP | 10-308198 A | | 11/1998 |
| JP | 2000-021386 | * | 1/2000 |
| JP | 2000-21386 A | | 1/2000 |
| JP | 2000-058065 | | 2/2000 |
| JP | 2000-100408 | | 4/2000 |
| JP | 2000-123800 | | 4/2000 |
| JP | 2000-133236 | | 5/2000 |
| JP | 2000-173564 | * | 6/2000 |
| JP | 2000-173564 A | | 6/2000 |

OTHER PUBLICATIONS

Certified translation of JP 10-208708, Aug. 7, 1998.*
Certified translation of JP 2000-173564, Jun. 23, 2000.*

* cited by examiner

*Primary Examiner*—Jonathan Crepeau
(74) *Attorney, Agent, or Firm*—Birch, Stewart, Kolasch & Birch, LLP

(57) ABSTRACT

A lithium based battery includes a cell structure group formed by stacking unit cells each including a positive electrode, a negative electrode, and a separator interposed therebetween, or formed by repeatedly folding or winding an integral body of the unit cells; a battery container for containing the cell structure group; and an electrolyte, which is poured in the battery container after the cell structure group is contained in the battery container. The outer peripheral surface of the battery container is covered with an ion impermeable and extensible high polymer sheet having a tensile elongation percentage of 1% or more. With this configuration, even if there happens such a severe accident that nail pieces the battery or the battery is crashed, it is possible to prevent a large short-circuit current from flowing between the positive and negative electrodes, and hence to ensure a higher safety of the battery.

8 Claims, 11 Drawing Sheets

LITHIUM-BASED BATTERY HAVING EXTENSIBLE, ION-IMPERMEABLE POLYMER COVERING ON THE BATTERY CONTAINER

BACKGROUND OF THE INVENTION

The present invention relates to a lithium based battery, such as a lithium secondary battery or a lithium ion secondary battery, which is operable with a high level of safety.

A non-aqueous secondary battery is assembled by preparing a cell structure group formed by stacking unit cells each including a positive electrode, a negative electrode, and a separator interposed therebetween, or winding an integral body of the unit cells; containing the cell structure group in a battery container; and filling the battery container with a non-aqueous electrolyte. In addition, the positive electrode is formed by supporting a positive active material such as lithium cobaltate on a collector such as an aluminum foil, and the negative electrode is formed by supporting a negative active material such as graphite on a collector such as a copper foil.

The above nonaqueous electrolyte secondary battery employs a material with its reactivity higher than that of an aqueous electrolyte secondary battery, and therefore, it must be operated with attention given, particularly, to the safety measure thereof. From this viewpoint, for example, a method (1) of providing a safety valve for releasing a high pressure gas from the inside of a battery container, a method (2) of using a PTC device, and a method (3) of using a shutdown separator for limiting a current flowing at the time of outer short-circuit or an inner short-circuit, have been disclosed (see Japanese Patent Laid-open Nos. 2000-58065, 2000-100408, and 2000-133236).

The PTC device in the method (2), which has a PTC (Positive Temperature Coefficient) characteristic, is configured such that the resistance becomes higher with an increase in temperature in the battery, to limit a current flowing at the time of outer short-circuit. The shutdown separator in the method (3) is configured to be melted when heated at a high temperature, to lose the ion impermeability thereof. Accordingly, if the shutdown separator is inserted between electrodes, it is possible to limit a current flowing between the electrodes at the time of outer short-circuit or inner short-circuit.

By the way, if a sharpened metal rod such as a nail pierces a battery as shown in FIG. 16, the metal rod penetrates a positive electrode 1 and a separator 3, and reaches a negative electrode 2. As a result, a positive collector 1a and a positive active material are brought into direct-contact with the metal rod 9 and also a negative collector 2a and a negative active material are brought into direct-contact with the metal rod 9, so that the positive electrode 1 is internally short-circuited with the negative electrode 2 via the metal rod 9. In this case, since a current flows only in the battery, the current limitation by the PTC device in the method (2) is useless, and the shutdown separator in the method (3) also fails to prevent a large current from flowing between the positive and negative electrodes 1 and 2 at the instant when the metal rod 9 pierces the electrodes 1 and 2 via the separator 3.

When a battery is crashed, the separator 3 may be often broken, to cause short-circuit between the positive electrode 1 and the negative electrode 2. In this case, the PTC device in the method (2) is useless, and the shutdown separator in the method (3) also fails to prevent a large current from flowing between the positive and negative electrodes 1 and 2 at the instant when the metal rod 9 pierces the electrodes 1 and 2 via the separator 3.

In this way, the prior art battery is disadvantageous in that if there happens a severe accident due to external causes, for example, if a nail pierces the battery or the battery is crashed, a significantly large short-circuit current instantly flows between electrodes, to bring the battery into a high temperature/high pressure state, with a result there occurs a fear that the battery is ignited and/or burst. The prior art battery, therefore, has a problem that it cannot keep a sufficient safety.

SUMMARY OF THE INVENTION

An object of the present invention is to provide a lithium based battery such as a lithium secondary battery or a lithium ion secondary battery, which is capable of preventing a large current from flowing between electrodes, even if there happens a severe accident due to external causes, for example, even if a nail pierces the battery or the battery is crashed, thereby improving the safety.

To achieve the above object, according to a first aspect of the present invention, there is provided a lithium based battery including; a cell structure group formed by stacking unit cells each including a positive electrode, a negative electrode, and a separator interposed therebetween, or formed by repeatedly folding or winding an integral body of the unit cells; a battery container for containing the cell structure group; and an electrolyte, which is poured in the battery container after the cell structure group is contained in the battery container; wherein the outer peripheral surface of the battery container is covered with an ion impermeable and extensible high polymer sheet having a tensile elongation percentage of 1% or more.

According to a second aspect of the present invention, there is provided a lithium based battery including: a cell structure group formed by stacking unit cells each including a positive electrode, a negative electrode, and a separator interposed therebetween, or formed by repeatedly folding or winding an integral body of the unit cells; and an electrolyte; wherein the outer periphery of the cell structure group is covered with an ion impermeable and extensible high polymer sheet having a tensile elongation percentage of 1% or more.

According to a third aspect of the present invention, there is provided a lithium based battery including: a cell structure group formed by stacking unit cells each including a positive electrode, a negative electrode, and a separator interposed therebetween, or formed by repeatedly folding or winding an integral body of the unit cells; a battery container for containing the cell structure group; and an electrolyte, which is poured in the battery container after the cell structure group is contained in the battery container; wherein the outer peripheral surface of the battery container is covered with an ion impermeable and extensible high polymer sheet having a tensile elongation percentage of 1% or more, and also the outer periphery of the cell structure group is covered with the ion impermeable and extensible high polymer sheet.

According to a fourth aspect of the present invention, there is provided a lithium based battery including: a cell structure group formed by stacking unit cells each including a positive electrode, a negative electrode, and a separator interposed therebetween, or formed by repeatedly folding or winding an integral body of the unit cells; a battery container for containing the cell structure group; and an electrolyte, which is poured in the battery container after the cell structure group is contained in the battery container; wherein the positive electrode and the negative electrode of each of the unit cells are respectively formed on one surface of a positive collector and one surface of a negative collector in such a manner as to face to each other with the separator put therebetween; and an ion impermeable and extensible high polymer sheet having a tensile elongation percentage of 1% or more is disposed between adjacent two of the unit cells and/or on the outer peripheral surface of each of the unit cells.

According to a fifth aspect of the present invention, in addition to the configuration of the lithium based battery described in any one of the first to third aspects, the positive electrode and the negative electrode of each of the unit cells are respectively formed on one surface of a positive collector and one surface of a negative collector in such a manner as to face to each other with the separator put therebetween; and an ion impermeable and extensible high polymer sheet having a tensile elongation percentage of 1% or more is disposed between adjacent two of the unit cells and/or on the outer peripheral surface of each of the unit cells.

The present invention configured as described above exhibits the following effects:

The lithium based battery of the present invention is characterized by including a cell structure group formed by stacking unit cells each including a positive electrode, a negative electrode, and a separator interposed therebetween, or formed by repeatedly folding or winding an integral body of the unit cells; a battery container for containing the cell structure group; and an electrolyte, which is poured in the battery container after the cell structure group is contained in the battery container, wherein the outer peripheral surface of the battery container is covered with an ion impermeable and extensible high polymer sheet having a tensile elongation percentage of 1% or more; the outer periphery of the cell structure group is covered with the extensible high polymer sheet; and/or the extensible high polymer sheet is disposed between adjacent two of the unit cells and/or on the outer peripheral surface of each of the unit cells. Accordingly, if there happens a severe accident due to external causes, for example, if a nail pieces the battery or the battery is crashed, the high polymer sheet is effectively deformed between the positive and negative electrodes, to prevent a large current from instantly flowing between the electrode, thereby preventing the battery from being brought into a high temperature/high pressure state, with a result that the battery can be prevented from being burst and/or ignited. In this way, according to the present invention, it is possible to provide a lithium based battery such as a lithium secondary battery or a lithium ion secondary battery with the improved safety.

In addition, according to the present invention, the outer peripheral surface of the battery container is covered with the extensible high polymer sheet having a high tensile elongation percentage; the outer periphery of the cell structure group is covered with the extensible high polymer sheet; and/or the extensible high polymer sheet is disposed between adjacent two of the unit cells and/or on the outer peripheral surface of each of the unit cells, and consequently, the corner portions of the battery can be protected and also the cell structure group and/or the unit cells can be positively fixed.

DETAILED DESCRIPTION OF THE PREFERRED EMBODIMENTS

Hereinafter, preferred embodiments of the present invention will be described with reference to the drawings.

First Embodiment

Figure 1:
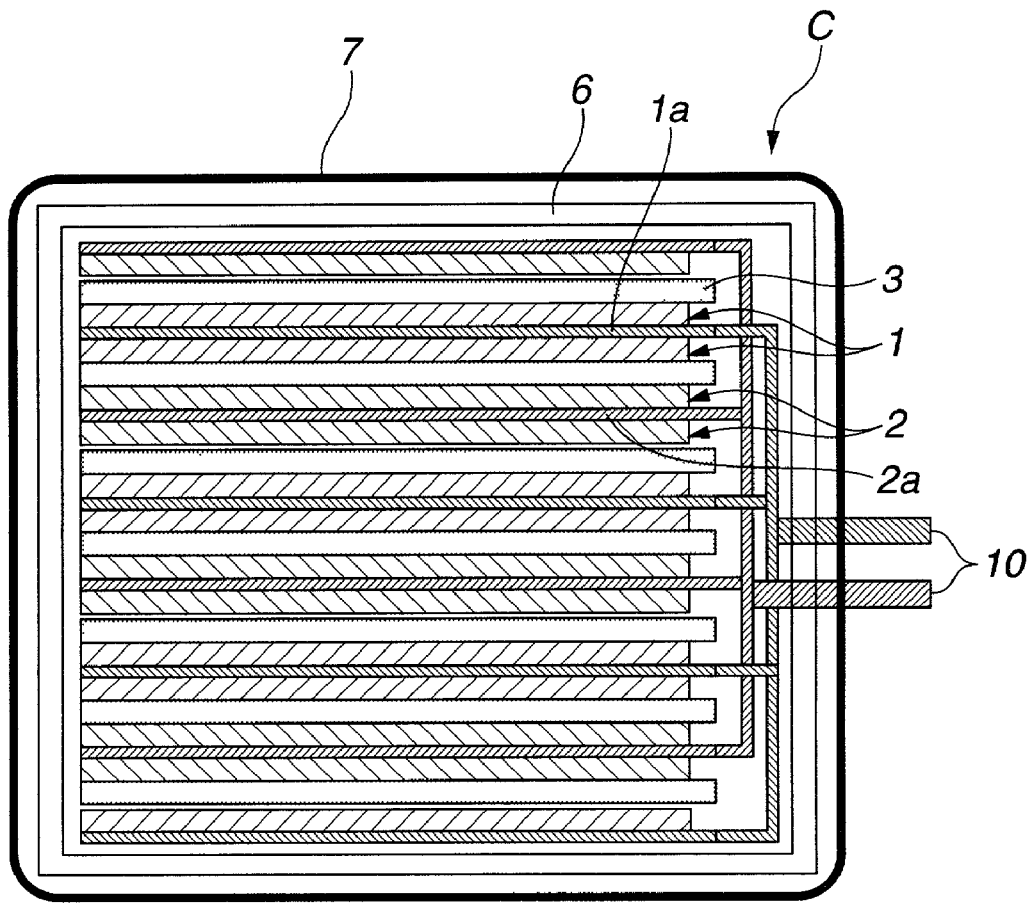
FIG. 1 is a schematic sectional view of a lithium based battery according to a first embodiment of the present invention.
Figure 2:
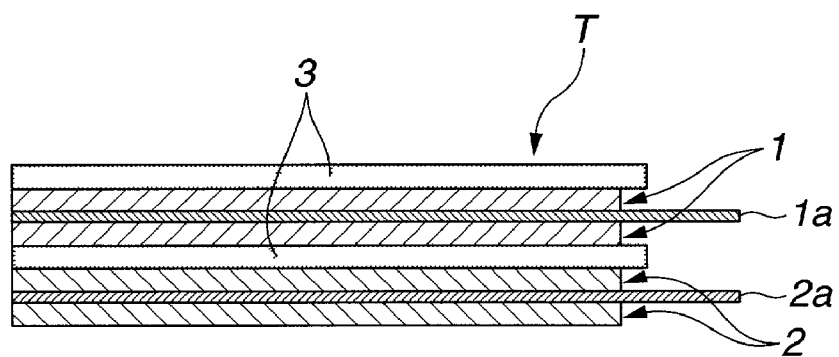
FIG. 2 is a schematic sectional view of one of unit cells of the lithium based battery shown in FIG. 1.

FIG. 1 is a schematic sectional view of a lithium based battery C according to a first embodiment of the present invention; FIG. 2 is a schematic sectional view of a unit cell T; and FIG. 3 is a schematic sectional view illustrating the assembly of a cell structure group M of the lithium based battery.

Referring to FIG. 1, the lithium based battery C according to the first embodiment is obtained by stacking unit cells T, each having a positive electrode 1, a negative electrode 2, and a separator 3 interposed therebetween, to each other to form a cell structure group M; containing the cell structure group M in a battery container 6; filling the battery container 6 with an electrolyte; and covering the outer peripheral surface of the battery container 6 with an ion impermeable and extensible high polymer sheet 7 having a tensile elongation percentage of 1% or more. As shown in FIG. 1, positive collectors 1a are connected to a tab 10 as a positive terminal, and negative collectors 2a are connected to another tab 10 as a negative terminal.

Figure 3:
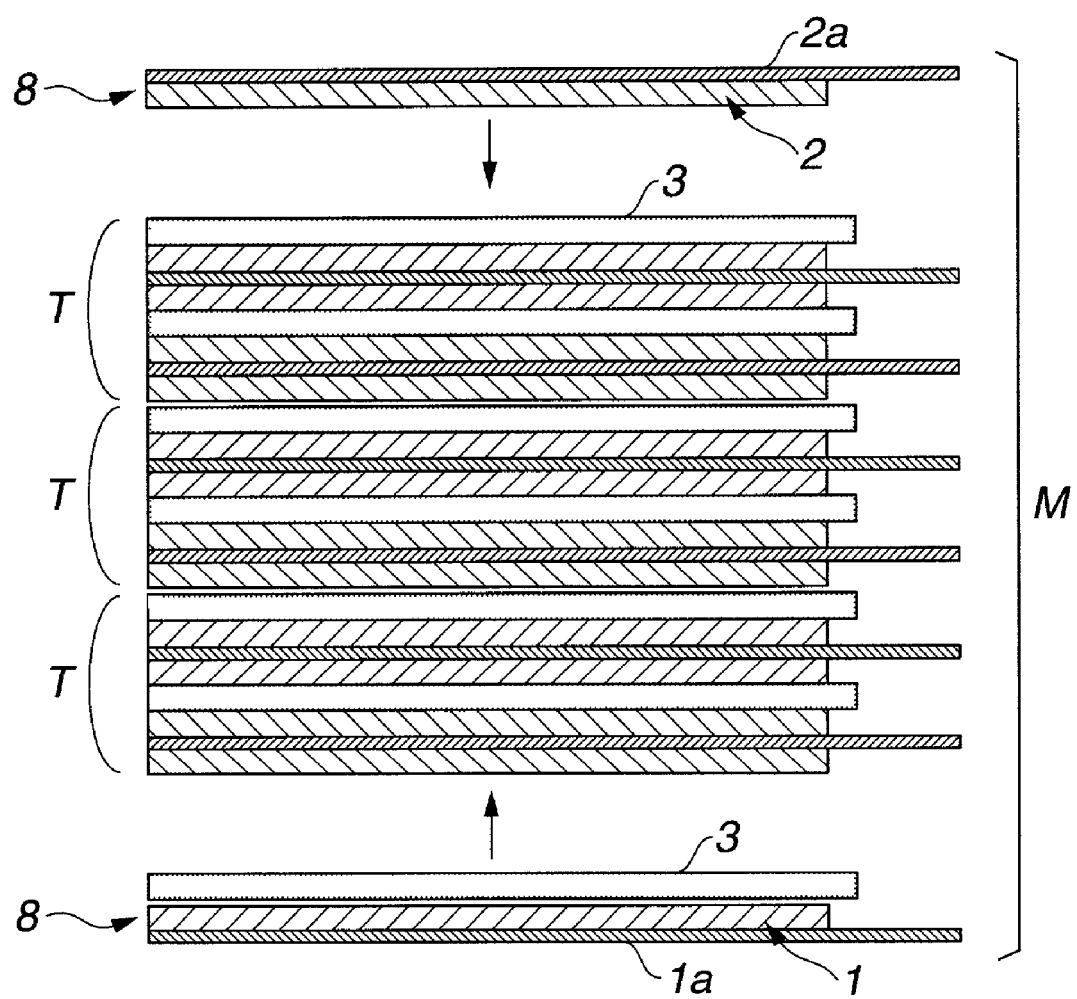
FIG. 3 is a schematic sectional view illustrating the assembly of a cell structure group of the lithium based battery shown in FIG. 1.

The positive electrode 1 (negative electrode 2) as an essential component of the unit cell T can be configured as a double-side coated electrode type in which two electrode portions are provided on both surfaces of the positive collector 1a (negative collector 2a) as shown in FIG. 2, or configured as a single-side coated electrode type in which one electrode portion is provided on one surface of the positive collector 1a (negative collector 2a) as shown by reference numeral 8 in FIG. 3. According to the first embodiment, as shown in FIG. 3, the cell structure group M is formed by stacking three pieces of the unit cells T, and arranging two single-side coated electrode type electrode bodies 8 on the uppermost portion and the lowermost portion. In this case, the arrangement relationship between the positive electrode and the negative electrode may be reversed. Although three pieces of the unit cells T are stacked in this embodiment shown in FIGS. 1 and 3, the number of the stacked unit cells is not particularly limited insofar as the number is one or more. While not shown, the cell structure group M can be formed by repeatedly folding the unit cell T.

The battery container 6 is formed of a packaging material, examples of which preferably include a foil of a metal such as aluminum or stainless steel, and a laminated high polymer film having a sufficient strength.

The laminated high polymer film is preferably formed by suitably stacking three to five layers of polyester, biaxial oriented polyester, polypropylene, polyethylene, nylon, oriented nylon, and aluminum foil.

The lithium based battery of the present invention is characterized in that the outer peripheral surface of the battery container 6 is covered with the ion impermeable and extensible high polymer sheet 7 having a tensile elongation percentage of 1% or more.

The tensile elongation percentage of the extensible high polymer sheet 7 of the present invention is in a range of 1% or more, preferably, 30% or more, more preferably, 100% or more, still more preferably, 150% or more, most preferably, 200% or more. The upper limit of the tensile elongation percentage is not particularly specified but is preferably set to 1500%. In the case where the tensile elongation percentage of the high polymer sheet covering the battery container is excessively small, if there happens an accident due to external causes, for example, if a nail pierces the battery, the high polymer sheet cannot be effectively deformed between adjacent two of the positive and negative electrodes, to allow a large current to instantly flow therebetween, bringing the battery into a high temperature/high pressure state, with a result that the buttery may be burst and/or ignited.

The above-described tensile elongation percentage of the extensible high polymer sheet 7 is a value measured under "Tensile Testing Method for Vulcanized Rubber" specified in JIS K6251-1993. The tensile testing method for the extensible high polymer sheet 7 is performed by preparing a No. 7 dumbbell-shaped test piece, straining the test piece at a straining rate of 100±10 mm/min, measuring a gauge length at break, and determining the tensile elongation percentage on the basis of the following relational expression. In addition, the measurement of the tensile elongation percentage of the extensible high polymer sheet 7 is performed in a standard temperature state (23±2° C.) specified in JIS K7100; however, the tensile elongation percentage of the extensible high polymer sheet 7 can be kept within the above-described range even in a battery operational temperature range, that is, in a temperature range of −20° C. to 80° C.

Elongation (%) at Break=[(Gauge Length (mm) at Break−Gauge Length (mm))/Gauge Length (mm)]×100

The extensible high polymer sheet 7 of the present invention has ion impermeability, and preferably, it has other performances such as insulation, heat-resistance, and gas impermeability. The term "ion impermeability" used herein means that the high polymer sheet having ion impermeability little or less allows the permeation of ions therethrough, and more specifically, means that the high polymer sheet having ion impermeability does not allow the permeation of ions in an amount allowing operation of the battery therethrough. With the configuration that the outer peripheral surface of the battery container 6 with the extensible high polymer sheet 7, it is possible to prevent the battery from being burst and/or ignited due to such an accident that a nail pierces the battery or the battery is crashed, without use of a conventional ion permeable extensible separator provided with pores. The thickness of the extensible high polymer sheet 7 is generally in a range of about 30 μm to 1 mm.

The extensible high polymer sheet 7 can be made from one kind or two or more kinds selected from a group consisting of a polyamide based elastomer, a polyurethane based elastomer, a polyolefin based elastomer, a polyester based elastomer, a styrene based elastomer, a vinyl chloride based elastomer, and a fluorine based elastomer. Of these materials, the styrene based elastomer, polyolefin based elastomer, polyurethane based elastomer, and fluorine based elastomer are preferably used, and the polyurethane based elastomer and fluorine based elastomer are most preferably used.

The styrene based elastomer contains polystyrene as a hard segment, and polybutadiene, polyisoprene, hydrogenated polybutadiene, hydrogenated polyisoprene, or hydrogenated butadiene (or styrene-butadiene) rubber as a soft rubber.

The polyolefin based elastomer contains polypropylene or polyethylene as a hard segment, and ethylene-propylene based rubber (EPDM, EPM, EBM), or hydrogenated butadiene (or styrene-butadiene) rubber as a soft segment, which elastomer has a good tensile elongation percentage of 300 to 600% and has a good moldability being enough for the elastomer to be molded into a film shape.

The polyester based elastomer contains polyester as a hard segment and polyether or polyester as a soft segment, which elastomer has a wide operational temperature range.

The polyamide based elastomer contains polyamide as a hard segment, and polyester or polyether as a soft segment.

The vinyl chloride based elastomer contains crystalline polyvinyl chloride as a hard segment, and an amorphous PVC or acrylonitrile-butadiene rubber (NBR) as a soft segment.

The polyurethane based elastomer contains a urethane structure as a hard segment, and polyester or polyether as a soft segment, which elastomer has a good tensile elongation percentage of 400 to 1200% and has a good moldability being enough for the elastomer to be molded into a film shape.

The fluorine based elastomer contains a fluororesin as a hard segment and a fluoro-rubber as a soft segment, which elastomer has a good tensile elongation percentage of 400 to 1200% and has a good moldability being enough for the elastomer to be molded into a film shape.

As the extensible high polymer sheet, the polyurethane based elastomers are preferred. More specifically, a thermoplastic polyurethane based elastomer used for the extensible high polymer sheet is produced by polyaddition reaction of (A) a long-chain polyol compound, (B) a chain elongating agent, and (C) a polyisocyanate compound as main components. The elastomer is polymerized via urethane bonds in molecules.

The number-average molecular weight of the long-chain polyol compound as the component (A) is preferably in a range of 1,000 to 5,000, more preferably, 1,500 to 3,000. If the number-average molecular weight of the long-chain polyol compound is excessively small, the physical properties, such as the heat-resistance and tensile elongation percentage, of a polyurethane film obtained may be often degraded, whereas if it is excessively large, the viscosity during the synthesis rises and the stability in production of a thermoplastic polyurethane based elastomer obtained may be often degraded. It is to be noted that the number-average molecular weight of the long-chain polyol compound means a number-average molecular weight calculated on the basis of a hydroxyl value measured under JIS K1577.

The long-chain polyol compound as the (A) component is exemplified by (1) a polyester-polyol, and (2) a polyether-polyol.

The polyester-polyol (1) is obtained by reaction of a dicarboxylic acid such as poly(1,4-butyleneadipate), poly(1,6-hexaneadipate), polycaprolactone, adipic acid, or phthalic acid with an alkylene glycol such as ethylene glycol or diethylene glycol.

Examples of polycarboxylic acid components for producing the polyester-polyol (1) may include a linear aliphatic dicarboxylic acid having the carbon number of 5 to 15, such as glutaric acid, adipic acid, pimelic acid, suberic acid, azelaic acid, sebacic acid, or dodecanedicarboxylic acid; a branched-chain aliphatic dicarboxylic acid having the carbon number of 5 to 14, such as 2-methylsuccinic acid, 2-methyladipic acid, 3-methyadipic acid, 3-methypentane diacid, 2-methyloctane diacid, 3,8-dimethyldecane diacid, or 3,7-dimethyldecane diacid; an aromatic dicarboxylic acid such as terephthalic acid, isophthalic acid, or orthophthalic acid; and esterification derivatives thereof. The above materials can be used singly or in combination of two or more kinds. Of these materials, the linear or branched-chain aliphatic dicarboxylic acid having the carbon number of 5 to 14 is preferable, and particularly, adipic acid, azelaic acid, or sebacic acid is more preferable. If needed, the above dicarboxylic acid can be used in combination with a small amount of a polycarboxylic acid having three or more functional groups. As such a polycarboxylic acid, there can be used a tricarboxylic acid such as trimellitic acid or trimesic acid. The above tricarboxylic acids can be used singly or in combination of two or more kinds.

Examples of the polyol components for producing the polyester-polyol (1) may include a linear aliphatic diol having the carbon number of 2 to 14, such as ethylene glycol, 1,3-propanediol, 1,4-butanediol, 1,5-pentanediol, 1,6-hexanediol, 1,7-heptanediol, 1,8-octanediol, 1,9-nonanediol, or 1,10-decanediol; a branch-chain aliphatic diol having the carbon number of 3 to 14, such as 2-methyl-1,3-propanediol, neopentyl glycol, 3-methyl-1,5-pentanediol, or 2-methyl-1,8-octanediol; and an alicyclic diol such as cyclohexanedimethanol or cyclohexanediol. These material can be used singly or in combination of two or more kinds. In particular, the branch-chain aliphatic diol having the carbon number of 4 to 10 is preferable, and particularly, 3-methyl-1,5-pentanediol is more preferable.

If needed, the above-described diol can be used in combination with a small amount of a polyol having three or more functional groups. Examples of such polyols may include glycerol, trimethylolpropane, butanetriol, hexanetriol, trimethylolbutane, trimethylolpentane, or pentaerythritol. These materials can be used singly or in combination of two or more kinds. In particular, trimethylolpropane is preferable.

Examples of the polyether-polyols (2) may include polyethylene glycol, polypropylene glycol, EO/PO copolymer, and polyoxytetramethylene glycol. These materials can be used singly or in combination of two or more kinds.

As the chain elongating agent as the component (B), there is preferably used a low molecular weight compound in which two active hydrogen atoms reactive with an isocyanate group are present in a molecule, and the molecular weight is in a range of 300 or less.

Examples of the low molecular weight compounds may include an aliphatic diol such as ethylene glycol, diethylene glycol, 1,3-propanediol, 1,4-butanediol, 1,5-pentanediol, 1,6-hexanediol, 1,7-heptanediol, 1,8-octanediol, or 1,9-nonanediol; an aromatic diol or alicyclic diol such as 1,4-bis(β-hydroxyethoxy)benzene, 1,4-cyclohexanediol, bis(β-hydroxyethyl)terephthalate, or xylene glycol; a diamine such as hydrazine, ethylenediamine, hexamethylenediamine, propylenediamine, xylylenediamine, isophoronediamine, piperazine, piperazine derivatives, phenylenediamine, or tolylenediamine; and an aminoalcohol such as adipic acid hydrazide or isophthalic acid hydrazide. These materials can be used singly or in combination of two or more kinds.

Examples of the polyisocyanate compounds as the components (C) may include an aromatic diisocyanate such as tolylene diisocyanate, 4,4'-diphenylmethane diisocyanate, p-phenylene diisocyanate, 1,5-naphthylene diisocyanate, 3-3'-dichloro-4,4'-diphenylmethane diisocyanate, or xylylene diisocyanate; and an aliphatic or alicyclic diisocyanate such as hexamethylene diisocyanate, isophorone diisocyanate, 4,4'-dicyclohexylmethane diisocyanate, or hydrogenated xylylene diisocyanate. These materials can be used singly or in combination of two or more kinds. The polyisocyanate compound can be used in combination with a small amount of a polyisocyanate compound having three or more functional groups, such as triphenylmethane triisocyanate.

According to the present invention, preferably, the chain elongating agent as the component (B) in an amount of 1 to 200 parts by mass, preferably, 5 to 100 parts by mass and the polyisocyanate compound as the component (C) in an amount of 5 to 200 parts by mass, preferably, 20 to 100 parts by mass are added to the long-chain polyol compound as the component (A) in an amount of 100 parts by mass.

The method of producing the thermoplastic polyurethane based elastomer of the present invention is not particularly limited but may be carried out by mixing the long-chain polyol compound as the component (A), the chain elongating agent as the component (B), the polyisocyanate compound as the component (C), and other components as needed, and uretanating the resultant mixture under an urethane catalyst in accordance with a pre-polymer process or a one-shot process using the known urethanating reaction technique. In particular, a method of performing melt polymerization substantially under the absence of solvent is preferable, and a method of performing continuous melt polymerization by using a multiaxial screw-type extruder is more preferable.

As the urethane catalyst, there is preferably used a tin-based urethane catalyst. Examples of the tin-based urethane catalysts may include dibutyltin diacetate, dibutyltin dilaurate, and dibutyltin bis(3-mercaptopropionic acid ethoxybutyl ester) salt. The added amount (converted into amount of tin atoms) of the urethane catalyst is preferably in a range of 5 ppm or less. If the added amount of the urethane catalyst is more than 5 ppm, the resistances against hot-water, heat, and moisture at a high temperature of a polyurethane elastomer obtain may be degraded.

With respect to the thermoplastic polyurethane based elastomer thus obtained, the weight-average molecular weight thereof is preferably in a range of 5,000 to 500,000, more preferably, 10,000 to 300,000, and the NCO index ([NCO]/[OH]) thereof may be in a range of 0.95 to 1.05, preferably, 1.0 to 1.03. In addition, the NCO index is a ratio of the number of moles of the NCO groups of the polyisocyanate compound to the number of moles of the total OH groups (active hydrogen groups) of the long-chain polyol.

The thermoplastic polyurethane based elastomer thus obtained is formed into a film shape by a melt extrusion (film extrusion) process or a solvent cast process.

According to the melt extrusion (film extrusion) process, the thermoplastic polyurethane based elastomer is heated at a temperature of a melting point thereof or more and kept at such a temperature to be melted, extruded from a T-die or a slit nozzle and is drawn as needed, and cooled. A film having a thickness of about 20 μm to 1 mm can be thus obtained.

According to the solvent cast process, the thermoplastic polyurethane based elastomer is dissolved in a solvent capable of dissolving the elastomer, and the resultant solution is cast on a flat base by using a doctor knife or a bar coater, followed by evaporation of the solvent, to be thus formed into a film shape.

Among the extensible high polymer sheets, the polyurethane based elastomers are preferably used.

The extensible high polymer sheet is preferably ionic impermeable. The ionic impermeable property means that ionic conductivity is low. Therefore, if the ionic impermeable sheet is used as a separator by providing it between electrodes, a cell is not prepared.

The preferred extensible high polymer sheet has a conductivity of up to $1 \times 10^{-6}$ S/cm at 25° C. The conductivity is measured as follows. The extensible high polymer sheet is immersed in a propylene carbonate solution containing 1 M $LiClO_4$ at 25° C. for 24 hours. Thereafter, the swelled sheet was interposed between two stainless steel sheets to measure ionic conductivity of the sheet by a complex impedance method at 25° C.

The ionic impermeable sheet is not so swelled in an organic electrolyte. So, the sheet would have a swelling ratio of up to 130% when the swelling ratio is measured after the sheet is immersed in a propylene carbonate solution containing 1 M $LiClO_4$ at 20° C. for 24 hours and then the solution attached to the surface of the sheet is removed.

The extensible high polymer sheet used in the present invention preferably has an ionic conductivity of up to $1 \times 10^{-6}$ S/cm and/or a swelling ratio of up to 130%.

Swelling ratio (%)=[Weight (g) of sheet after immersed in propylene carbonate containing 1 M $LiClO_4$ at 20° C. for 24 hr]/[Weight (g) of sheet before immersed]

As shown in FIG. 1, the lithium based battery of the present invention has the same basic configuration as that of a usual lithium based battery except that the outer peripheral surface of the battery container 6 is covered with the extensible high polymer sheet 7. That is to say, as described above, the lithium based battery of the present invention includes the cell structure group formed by stacking the unit cells T each having the positive electrode 1, negative electrode 2, and the separator 3 interposed therebetween, or repeatedly folding or winding an integral body of the unit cells T (that is, the long-sized unit cell T).

The positive electrode 1 is preferably formed by applying a positive dope on either or each of the front and back surfaces of the positive collector 1a. The positive dope contains a binder resin, a positive active material, and a conductive material.

The positive collector 1a can be made from a material selected from stainless steel, aluminum, titanium, tantalum, and nickel. Of these materials, aluminum is preferable from the viewpoints of performance and economic advantage. The shape of the collector is not particularly limited. For example, the collector can be used in the shape of foil, expanded metal, plate, foam, wool, a three-dimensional structure such as a net, and the like.

Examples of the binder resins may include fluorine based polymers such as polyvinylidene fluoride (PVDF), vinylidene fluoride-hexafluoropropylene copolymer, vinylidene fluoride-trifluoroethylene chloride (CTFE) copolymer [P-(VDF-CTFE)], vinylidene fluoride-hexafluoropropylene fluoro-rubber, vinylidene fluoride-tetrafluoroethylene-hexafluoropropylene fluoro-rubber, vinylidene fluoride-tetrafluoroethylene-perfluoroalkylvinylether fluoro-rubber; and polypropylene oxide, polyethylene, polystyrene, polybutadiene, butyl rubber, nitrile rubber, styrene-butadiene rubber, propylene-butadiene rubber, polysulfide rubber, nitrocellulose, cyanoethylated polysaccharides such as cyanoethylcellulose, polysaccharide derivatives, and various latexes. These materials can be used singly or in combination of two or more kinds.

The positive active material may be suitably selected depending on the application of the electrode or the kind of the battery. Examples of the positive active materials, used for a positive electrode of a lithium secondary battery, may include a compound containing a group I metal, such as CuO, $Cu_2O$, $Ag_2O$, CuS, or $CuSO_2$; a compound containing a group IV metal, such as TiS, $SiO_2$, or SnO; a compound containing a group V metal, such as $V_2O_5$, $V_6O_{13}$, $VO_x$, $Nb_2O_5$, $Bi_2O_3$, or $Sb_2O_3$; a compound containing a group VI metal, such as $CrO_3$, $Cr_2O_3$, $MoO_3$, $MoS_2$, $WO_3$, or $SeO_2$; a compound containing a group VII metal, such as $MnO_2$ or $Mn_2O_4$; a compound containing a group VIII metal, such as $Fe_2O_3$, FeO, $Fe_3O_4$, $Ni_2O_3$, NiO, or $CoO_2$; and a conductive high polymer compound such as a polypyrrol, polyaniline, polyparaphenylene, polyacetylene, or polyacene based material.

The positive active material used for a positive electrode of a lithium ion secondary battery is exemplified by a chalcogen compound capable of absorbing/releasing lithium ions or a lithium ion containing chalcogen compound.

Examples of the chalcogen compounds capable of absorbing/releasing lithium ions may include $FeS_2$, $TiS_2$, $MoS_2$, $V_2O_5$, $V_6O_{13}$, and $MnO_2$.

Examples of lithium ion containing chalcogen compounds may include $LiCoO_2$, $LiMnO_2$, $LiMn_2O_4$, $LiMo_2O_4$, $LiV_3O_8$, $LiNiO_2$, $Li_xNi_yM_{1-y}O_2$ (M is at least one or more metals selected from Co, Mn, Ti, Cr, V, Al, Sn, Pb, and Zn, and x is in a range of $0.05 \leq x \leq 1.10$ and y is in a range of $0.5 \leq y \leq 1.0$).

Examples of the conductive materials may include carbon black, ketjen black, acetylene black, carbon whiskers, carbon fibers, natural graphite, and artificial graphite. A dispersant can be added to the conductive material as needed. Examples of the dispersants may include polar solvents such as N-methyl-2-pyrrolidone (NMP), dimethylformamide, dimethylacetoamide, and dimethylsulfoamide.

The positive electrode according to the present invention can be produced by mixing the binder resin, positive active material, and conductive material at a known mixing ratio, to form the positive dope, and applying the positive dope on the positive collector.

Thinning the positive electrode is not particularly limited but is preferably carried out by forming the positive electrode on the positive collector such as an aluminum foil to a uniform thickness by a roller coating process using an applicator roll, a screen coating process, a blade coating process using a doctor blade, a spin coating process, a bar coating process using a bar coater.

The negative electrode 2 is preferably formed by applying a negative dope on either or each of the front and back surfaces of the negative collector 2a. The negative dope contains a binder resin, and a negative active material. It should be noted that, as the binder resin, the same one as that is used for the positive electrode can be used.

The negative collector 2a may be made from a material selected from copper, stainless steel, and nickel. Of these materials, copper is preferable from the viewpoints of performance and economic advantage. The shape of the collector is not particularly limited. For example, the collector can be used in the shape of foil, expanded metal, plate, foam, wool, a three-dimensional structure such as a net, and the like.

The negative active material may be suitably selected depending on the application of the electrode or the kind of the battery. Examples of the negative active materials, used for a negative electrode of a lithium secondary battery, may include alkali metals, alkali metal alloys, carbon materials, and the same materials as those used as the positive active materials.

Examples of the alkali metals may include Li, Na, and K; and the examples of the alkali metal alloys may include Li alloys such as Li—Al, Li—Mg, and Li—Al—Ni, and Na alloys such as Na—Hg and Na—Zn.

Examples of the carbon materials may include graphite, carbon black, cokes, vitreous carbon, carbon fibers, and sintered bodies thereof.

The negative active material used for a negative electrode of a lithium ion secondary battery is exemplified by a material capable of reversibly storing/releasing lithium ions, such as a difficult-to-graphitize carbon material or graphite based carbon material. More specifically, examples of such carbon materials may include pyrolytic carbon materials, cokes (pitch coke, needle coke, petroleum coke), graphite materials, vitreous carbon materials, sintered bodies of organic high polymer compounds (obtained by sintering phenol resin, furan resin, or the like at a suitable temperature to carbonize the resin, carbon fiber or activated carbon). Additionally, a high polymer such as polyacetylene or polypyrrol or an oxide such as $SnO_2$ can be also used as the material capable of reversibly storing/releasing lithium ions.

The negative electrode according to the present invention can be produced by mixing the binder resin, negative active material, and solvent at a known mixing ratio, to form the negative dope, and applying the negative dope on the negative collector.

Thinning the negative electrode is not particularly limited but is preferably carried out by forming the negative electrode to a uniform thickness by a roller coating process using an applicator roll, a screen coating process, a blade coating process using a doctor blade, a spin coating process, a bar coating process using a bar coater.

The separator 3 is formed of a resin film having pores for ensuring ion permeability. The separator 3 is preferably configured as a so-called shutdown separator which is melted at a high temperature to close the pores, thereby losing the ion permeability.

Separators having no shutdown function can also be used. Examples of materials for forming the separator 3 may include a fluorine based polymer, a polyether such as polyethylene oxide or polypropylene oxide, a polyolefin such as polyethylene or polypropylene, polyacrylonitrile, polyvinylidene chloride, polymethylmethacrylate, polymethylacrylate, polyvinylalcohol, polymethacrylonitrile, polyvinylacetate, polyvinylpyrrolidone, polyethyleneimine, polybutadiene, polystyrene, polyisoprene, and derivatives thereof. These materials can be used singly or in combination of two or more kinds. In particular, the fluorine based polymer is preferably used as the material for forming the separator.

Examples of the fluorine based polymers may include polyvinylidene fluoride (PVDF), vinylidene fluoride-hexafluoropropylene (HFP) copolymer [P(VDF-HFP)], vinylidene fluoride-trifluoroethylene chloride (CTFE) copolymer [P(VDF-CTFE)], vinylidene fluoride-hexafluoropropylene fluoro-rubber [P(VDF-HFP)], vinylidene fluoride-tetrafluoroethylene-hexafluoropropylene fluoro-rubber [P(VDF-TFE-HFP)], and vinylidene fluoride-tetrafluoroethylene-perfluoroalkylvinylether fluoro-rubber. The vinylidene fluoride based polymer preferably contains 50 mass % or more, particularly, 70 mass % or more (upper limit: about 97 mass %) of vinylidene fluoride. In particular, polyvinylidene fluoride (PVDF), vinylidene fluoride-hexafluoropropylene copolymer [P(VDF-HFP)], and vinylidene fluoride-trifluoroethylene chloride copolymer [P(VDF-CTFE)] are preferably used. The copolymerization is preferable because the crystallinity becomes lower, to allow easy impregnation of an electrolyte and easy retention of the electrolyte. According to the present invention, not only a high polymer having a high swelling property but also a high polymer having a low swelling property such as PVDF may be used as the material for forming the separator.

The weight-average molecular weight of the fluorine based polymer used for the separator is in a range of 500,000 or more, preferably, 500,000 to 2,000,000, more preferably, 500,000 to 1,500,000. If the weight-average molecular weight is excessively small, the physical strength of the separator becomes significantly poor. As a result, the separator may be pierced with holes or broken, thereby failing to exhibit the separating function.

A filler can be added to the separator used for the battery of the present invention. The filler is not particularly limited in terms of kind (inorganic or organic), and physical properties such as shapes, diameter, density, and surface states of particles of the filler insofar as the particles of the filler can form a matrix in cooperation with the polymer constituting the separator, to form pores allowing impregnation of an electrolyte at the boundaries between the particles of the filler and the high polymer. Examples of powders of inorganic matters as the fillers may include powders of oxides, carbonates, and sulfates such as silicon oxide, titanium oxide, aluminum oxide, zinc oxide, calcium carbonate, calcium sulfate, tin oxide, chromium oxide, iron oxide, magnesium oxide, magnesium carbonate, and magnesium sulfate, and further carbides such as silicon carbide and calcium carbide, and nitrides such as silicon nitride and titanium nitride. Examples of powders of organic matters as the fillers may include various kinds of polymer particles non-compatible with the matrix of a polymer constituting the separator.

The particle size of particles of the filler is not particularly limited but may be in a range of 10 µm or less, preferably, 0.005 to 1 µm, more preferably, 0.01 to 0.8 µm. The added amount of the filler to the polymer, which is dependent on the kind of the polymer and the kind of the filler, may be in a range of 5 to 100 parts by mass, preferably, 30 to 100 parts by mass on the basis of the 100 parts by mass of the polymer.

The separator according to the present invention is produced by dissolving a polymer in a solvent, and dispersing a filler in the solvent as needed, to form a slurry. The solvent may be suitably selected from various kinds of solvents capable of dissolving the polymer, and preferably, having a high boiling point and a high safety from the industrial viewpoint. Examples of the solvents may include N,N-dimethylformamide (DMF), dimethylacetoamide, N-methylpyrrolidone, acetone, methyl ethyl ketone (MEK), and methyl isobutyl ketone. The concentration of the polymer to the solvent is preferably in a range of 5 to 25 mass %.

In place of adding a filler to the polymer for forming the separator of the present invention, there may be adopted a method of adding a plasticizer to the polymer, and extracting the plasticizer after formation of the polymer into a film shape. Examples of the plasticizers may include dimethyl adipate, diisobutyl adipate, dibutyl adipate, di-2-ethylhexyl adipate, diisodecyl adipate, dibutyldiglycol adipate, di-2-ethylhexyl azelate, dimethyl sebacate, dibutyl sebacate, di-2-ethylhexyl sebacate, methyl acetylricinoleate, dimethyl phthalate, diethyl phthalate, dibutyl phthalate, diheptyl phthalate, di-2-ethylhexyl phthalate, di-n-octyl phthalate, diisodecyl phthalate, butylbenzyl phthalate, diisononyl phthalate, and ethylphthalylethyl glycolate. Of these materials, dibutyl phthalate and dioctyl phthalate are preferably used from the viewpoint of easy extraction work. The added amount of the plasticizer is in a range of 10 to 200 parts by mass on the basis of the 100 parts by mass of the polymer.

The separator is interposed between the positive electrode and the negative electrode, to be thus assembled into a unit cell. To be more specific, the separator formed in a film shape is held between the positive and negative electrodes and is integrated therewith by a pressure applied between the positive and negative electrodes, to produce a unit cell; or the separator in the form of slurry is applied on the positive and negative electrodes, followed by hardening of the separator by heating, and the positive and negative electrodes are overlapped to each other, to produce a unit cell.

Next, as shown in FIG. 3, the unit cells T thus obtained are stacked to each other, and two one-side coated electrode bodies 8 are disposed on the uppermost and lowermost sides of the stack of the unit cells T, to form a cell structure group M. The cell structure group M is contained in a battery container 6 such as a battery can or a laminate pack, and the battery container 6 is filled with the electrolyte. The battery container 6 is then subjected to can-seal if configured as the battery can, or subjected to heat-seal if configured as the laminate pack, and subsequently, the outer peripheral surface of the battery container 6 is covered with the extensible high polymer sheet 7 of the present invention. The lithium based battery of the present invention is thus obtained.

The electrolyte used for the lithium based battery of the present invention is prepared by dissolving an ion conductive salt in a solvent capable of dissolving the ion conductive salt.

The ion conductive salt is not particularly limited insofar as it has been already used for usual lithium based batteries.

Examples of the ion conductive salts may include $LiClO_4$, $LiBF_4$, $LiAsF_6$, $LiPF_6$, $LiSbF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$, $(C_4H_9)_4NClO_4$, $LiN(CF_3SO_2)_2$, and $(C_2H_5)_4NPF_6$. These materials can be used singly or in combination of two or more kinds.

Examples of the solvents capable of dissolving the above ion conductive salts may include a chain ether such as dibutylether, 1,2-dimethoxyethane, 1,2-ethoxymethoxyethane, methyldiglyme, methyltriglyme, methyltetraglyme, ethylglyme, ethyldiglyme, butyldiglyme, or a glycol ether (ethyl cellosolve, ethyl carbitol, butyl cellosolve, or butyl carbitol); a heterocyclic ether such as tetrahydrofuran, 2-methyltetrahydrofuran, 1,3-dioxolane, or 4,4-dimethyl-1,3-dioxane; a butyrolactone such as γ-butyrolactone, γ-valerolactone, δ-valerolactone, 3-methyl-1,3-oxazolidine-2-one, or 3-ethyl-1,3-oxazolidine-2-one; and other solvents generally used for lithium based batteries, for example, water, an alcohol solvent (methanol, ethanol, butanol, ethylene glycol, propylene glycol, diethylene glycol, 1,4-butanediol, glycerol, or the like), a polyoxyalkylene-polyol solvent (polyethylene oxide, polypropylene oxide, polyoxyethylene-oxypropylene glycol, or the like, which may be used in combination of two or more kinds), an amide solvent (N-methylformamide, N-N-dimethylformamide, N-methylacetamide, N-methylpyrrolidinone, or the like), a carbonate solvent (diethyl carbonate, dimethyl carbonate, ethylmethyl carbonate, propylene carbonate, ethylene carbonate, styrene carbonate, or the like), and an imidazolidinone solvent (1,3-dimethyl-2-imidazolidinone or the like). These materials can be used singly or in combination of two or more kinds. In particular, the carbonate based solvent as a non-aqueous solvent, such as propylene carbonate, is preferable. In addition, the concentration of the ion conductive salt in the solvent is in a range of about 0.5 to 1.5 mol/L.

The electrolyte may contain a compound having at least one, preferably at least two reactive double bonds in addition to the ion conductive salt. The reactive double bond-bearing compound is reacted to form a three-dimensional network structure, thereby forming a polymer gel electrolyte.

Illustrative examples of the reactive double bond-bearing compound include compounds having two or more reactive double bonds, such as divinylbenzene, divinylsulfone, allyl methacrylate, ethylene glycol dimethacrylate, diethylene glycol dimethacrylate, triethylene glycol dimethacrylate, polyethylene glycol dimethacrylate (average molecular weight, 200 to 1,000), 1,3-butylene glycol dimethacrylate, 1,6-hexanediol dimethacrylate, neopentyl glycol dimethacrylate, polypropylene glycol dimethacrylate (average molecular weight, 400), 2-hydroxy-1,3-dimethacryloxypropane, 2,2-bis[4-(methacryloxyethoxy)phenyl]propane, 2,2-bis[4-(methacryloxyethoxy-diethoxy)phenyl]propane, 2,2-bis[4-(methacryloxyethoxy-polyethoxy)phenyl]propane, ethylene glycol diacrylate, diethylene glycol diacrylate, triethylene glycol diacrylate, polyethylene glycol diacrylate (average molecular weight, 200 to 1,000), 1,3-butylene glycol diacrylate, 1,6-hexanediol diacrylate, neopentyl glycol diacrylate, polypropylene glycol diacrylate (average molecular weight, 400), 2-hydroxy-1,3-diacryloxypropane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, trimethylolpropane triacrylate, trimethylolpropane trimethacrylate, tetramethylolmethane triacrylate, tetramethylolmethane tetraacrylate, water-soluble urethane diacrylate, water-soluble urethane dimethacrylate, tricyclodecane dimethanol acrylate, hydrogenated dicyclopentadiene diacrylate, polyester diacrylate and polyester dimethacrylate.

If necessary, a compound containing an acrylic or methacrylic group may be added. Examples of such compounds include acrylates and methacrylates such as glycidyl methacrylate, glycidyl acrylate, tetrahydrofurfuryl methacrylate, methoxydiethylene glycol methacrylate, methoxytriethylene glycol methacrylate and methoxypolyethylene glycol methacrylate (average molecular weight 200-1,200), as well as methacryloyl isocyanate, 2-hydroxymethylmethacrylic acid and N,N-dimethylaminoethylmethacrylic acid. Other reactive double bond-containing compounds may be added as well, such as acrylamides (e.g., N-methylolacrylamide, methylenebisacrylamide, diacetoneacrylamide), and vinyl compounds such as vinyloxazolines and vinylene carbonate.

To form a three-dimensional network structure, a compound having at least two reactive double bonds must be added. That is, a three-dimensional network structure cannot be formed using only a compound having but a single reactive double bond, such as methyl methacrylate. Some addition of a compound bearing at least two reactive double bonds is necessary.

Of the reactive double bond-bearing compounds described above, especially preferred reactive monomers include polyoxyalkylene component-bearing diesters of formula (1) below. The use of the latter in combination with a polyoxyalkylene component-bearing monoester compound of formula (2) below and a triester compound is recommended.

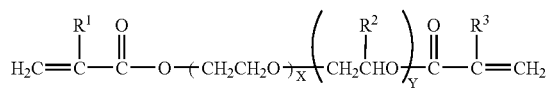
(1)

In formula (1), $R^1$, $R^2$ and $R^3$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and X and Y satisfy the condition $X \geq 1$ and $Y \geq 0$ or the condition $X \geq 0$ and $Y \geq 1$. The sum X+Y is preferably no higher than 100, and especially from 1 to 30. $R^1$, $R^2$ and $R^3$ are most preferably methyl, ethyl, n-propyl, i-propyl, n-butyl, i-butyl, s-butyl or t-butyl.

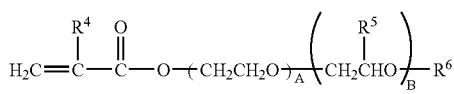
(2)

In formula (2), $R^4$, $R^5$ and $R^6$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and A and B satisfy the condition $A \geq 1$ and $B \geq 0$ or the condition $A \geq 0$ and $B \geq 1$. The sum A+B is preferably no higher than 100, and especially from 1 to 30. $R^4$, $R^5$ and $R^6$ are most preferably methyl, ethyl, n-propyl, i-propyl, n-butyl, i-butyl, s-butyl or t-butyl.

Of these, diesters of formula (1) wherein X=9, Y=0, and $R^1=R^3=CH_3$ are preferred, and monoesters of formula (2) wherein A=2 or 9, B=0, and $R^4=R^6=CH_3$ are preferred.

Trimethylolpropane trimethacrylate is typical of the triester compound.

Typically, the polyoxyalkylene component-bearing diester and the polyoxyalkylene component-bearing monoester and the triester are heated or exposed to a suitable form of radiation (e.g., electron beam, microwave, or radiofrequency radiation) within the electrolyte composition, or a mixture of the diester and monoester is heated, to form a three-dimensional network structure.

A three-dimensional network structure can generally be formed by reacting only a polyoxyalkylene component-bearing diester and triester. However, as already noted, the addition of a polyoxyalkylene component-bearing monoester, which is a monofunctional monomer, to the diester and triester which are polyfunctional monomers is preferred, the reason being that such addition introduces polyoxyalkylene branched chains into the three-dimensional network.

Herein, the relative proportion of the polyoxyalkylene component-bearing diester, the polyoxyalkylene component-bearing monoester and the triester compound is not critical and may be determined as appropriate in accordance with the length of polyoxyalkylene component. It is preferred from the standpoint of gel strength enhancement that the weight ratio of diester compound to monoester compound fall within the range from 0.1 to 2, and especially from 0.3 to 1.5, and the weight ratio of diester compound to triester compound fall within the range from 2 to 15, and especially from 3 to 10.

Figure 15:
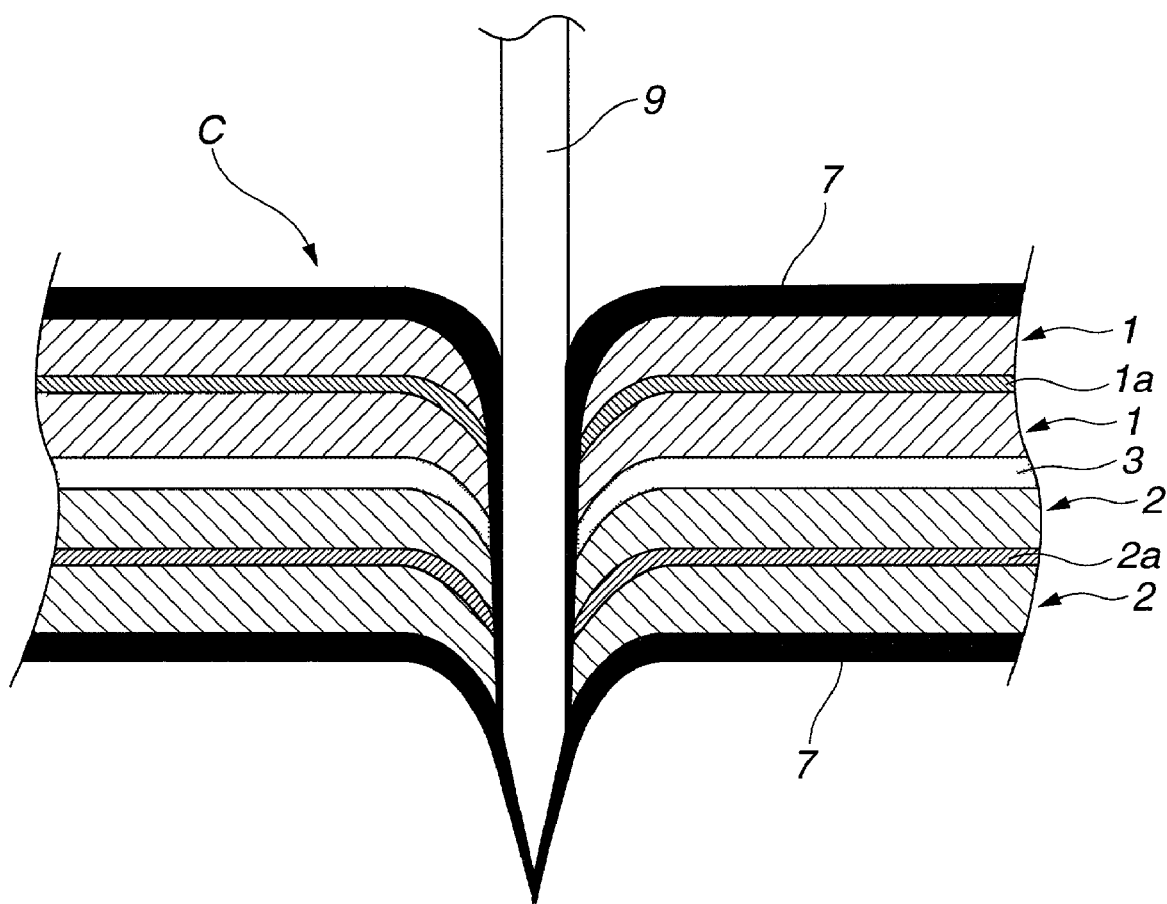
FIG. 15 is a partial sectional view showing a state in which a nail pierces a battery of the present invention.
Figure 16:
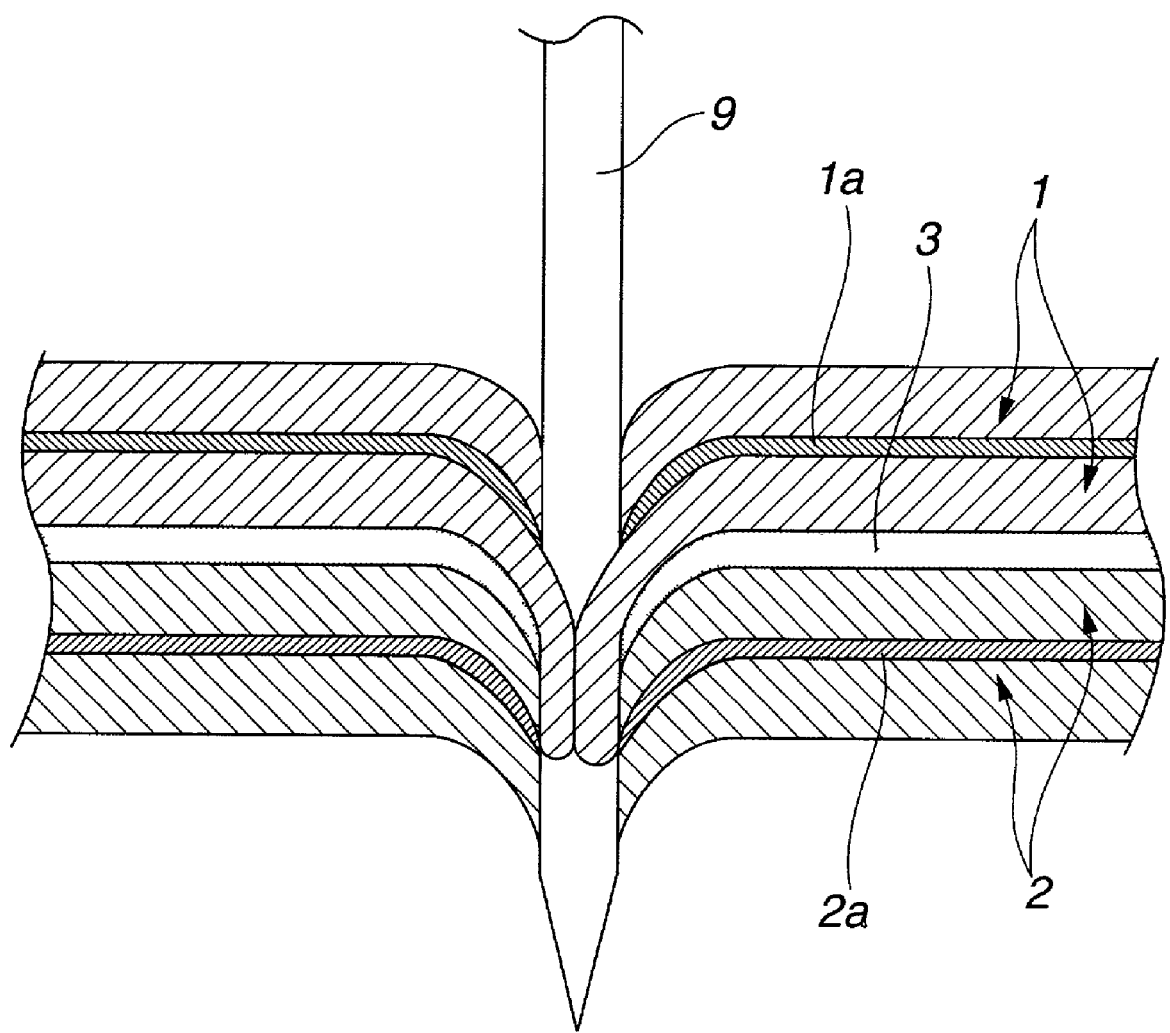
FIG. 16 is a partial sectional view showing a state in which a nail pierces a prior art battery.

According to the lithium based battery of the present invention, as shown in FIG. 15, even if a metal rod 9 such as a nail pierces, from external, the battery container (not shown) to penetrate the positive and negative electrodes 1 and 2 overlapped with each other via the separator 3, the extensible high polymer sheet 7 covering the outer peripheral surface of the battery container (not shown) extends along the metal rod 9 to cover the side surface of the metal rod 9, so that the thus extended high polymer sheet 7 having a significantly low electric conductivity is interposed between the metal rod 9 and each of the positive and negative electrodes 1 and 2 and between the metal rod 9 and each of the positive and negative electrodes 1a and 2a. As a result, it is possible to positively prevent a large short-circuit current from flowing between the positive and negative electrodes 1 and 2 via the metal rod 9, and hence to prevent the battery from being instantly brought into a high temperature/high pressure state and thereby from being burst and/or ignited.

Even if the battery is crashed by an external strong force and thereby the separator 3 is broken, since the extensible high polymer sheet 7 is interposed between the positive and negative electrodes 1 and 2, it is possible to prevent the positive and negative electrodes 1 and 2 from being internally short-circuited due to contact therebetween.

In addition, according to the present invention, since the outer peripheral surface of the battery container is covered with the extensible high polymer sheet, the corners of the battery as well as the surface of the battery can be protected.

While the first embodiment of the present invention has been described, the present invention is not limited thereto, and it is to be understood that various changes may be made without departing from the scope of the present invention.

Second Embodiment

Figure 4:
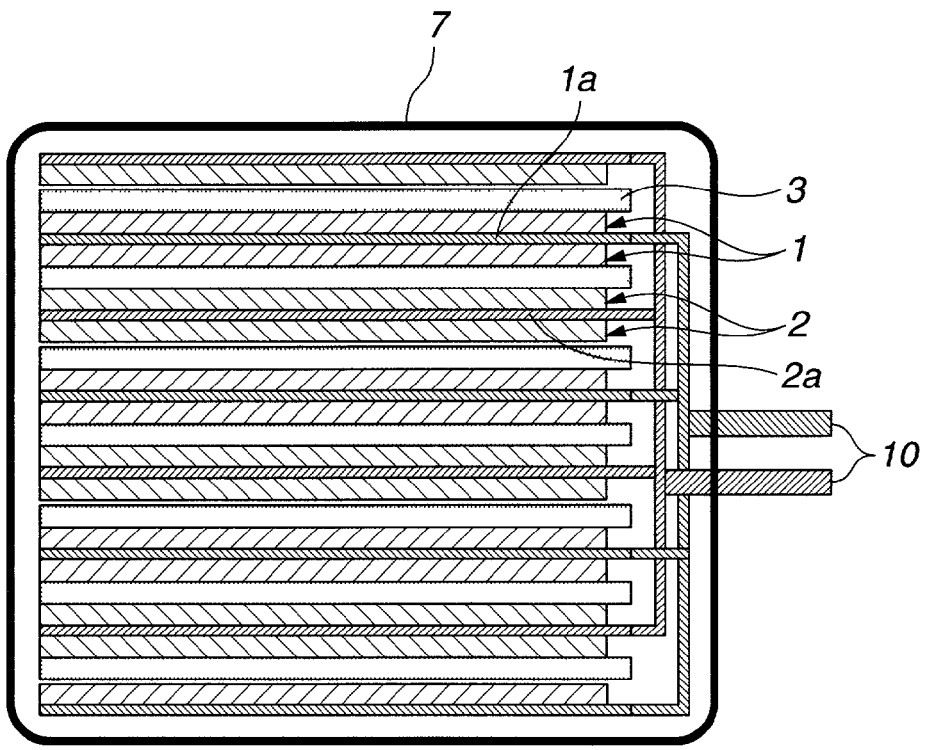
FIG. 4 is a schematic sectional view of a cell structure group of a lithium based battery according to a second embodiment of the present invention.

FIG. 4 is a schematic sectional view of a cell structure group M of a lithium based battery according to a second embodiment of the present invention. The lithium based battery of this embodiment includes the cell structure group M formed by stacking unit cells T each including a positive electrode 1, a negative electrode 2, and a separator 3 interposed therebetween, and an electrolyte, wherein the outer periphery of the cell structure group M is covered with an ion impermeable and extensible high polymer sheet 7 having a tensile elongation percentage of 1% or more.

In this case, after the outer periphery of the cell structure group M is covered with the extensible high polymer sheet, the electrolyte may be poured or impregnated in the battery. Alternatively, the electrolyte may be previously poured in the cell structure group, and the outer periphery of the cell structure group be then covered with the extensible high polymer sheet.

In the second embodiment, the extensible high polymer sheet 7 may be the same as that in the first embodiment, and other parts be also the same as the corresponding parts in the first embodiment, and therefore, the parts are designated by the same reference numerals as those of the corresponding parts in the first embodiment and the overlapped description thereof is omitted.

Figure 5:
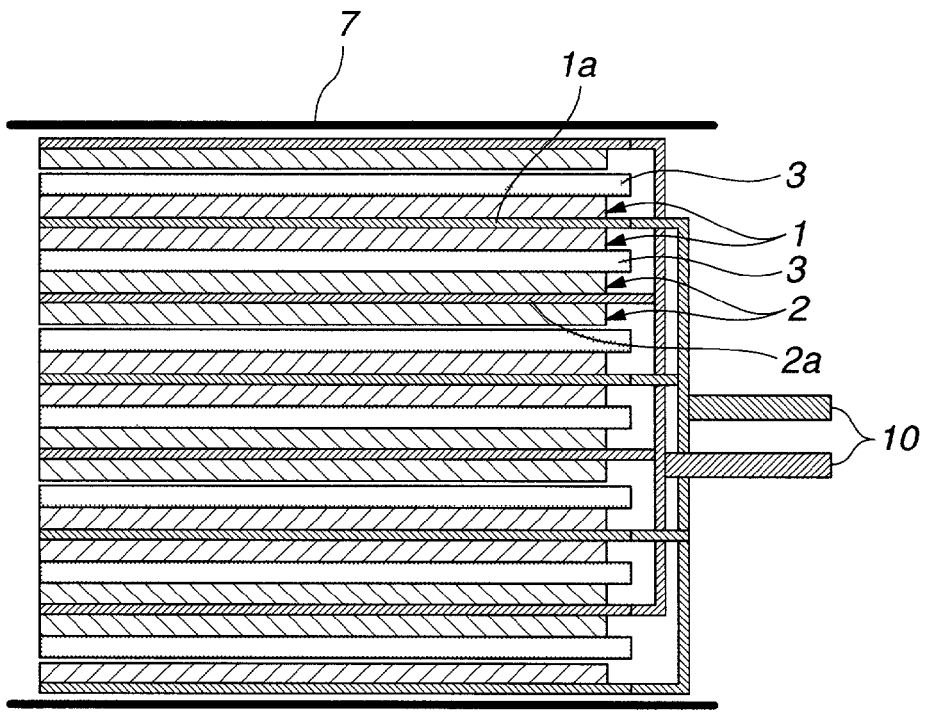
FIG. 5 is a schematic sectional view of a cell structure group of another lithium based battery according to the second embodiment of the present invention.
Figure 6A:
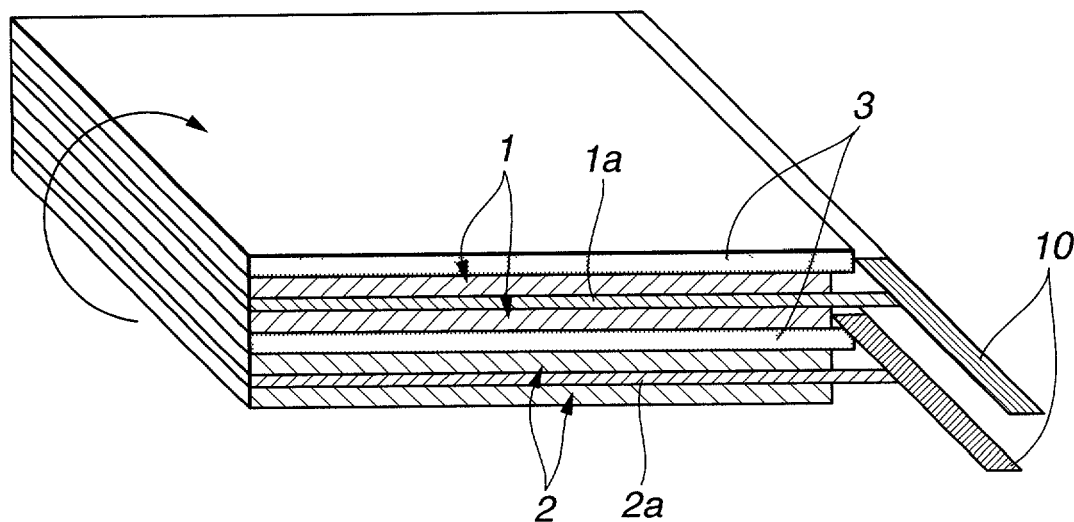
FIG. 6A is a perspective view of a cell structure group of a further lithium based battery according to the second embodiment of the present invention.
Figure 6B:
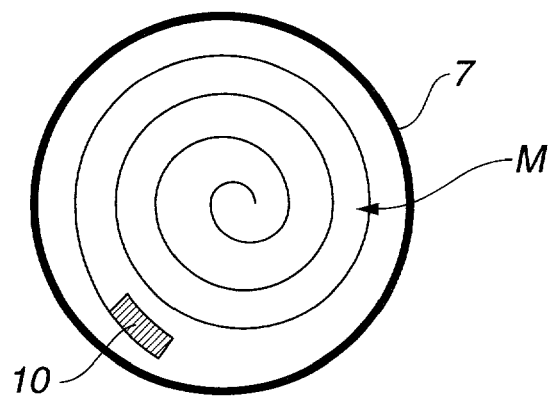
FIG. 6B is a schematic sectional view showing a state in which the outer peripheral surface of the cell structure group shown in FIG. 6A is covered with an extensible high polymer sheet.

The second embodiment can be modified such that the extensible high polymer sheets 7 are, as shown in FIG. 5, disposed on the uppermost and lowermost surfaces of the cell structure group M. The second embodiment can be also modified such that an integral body of the unit cells T (that is, the long-sized unit cell T) is wound in the direction shown in FIG. 6A, to form a cell structure group M, and the outer peripheral surface of the cell structure group M is, as shown in FIG. 6B, covered with the extensible high polymer sheet 7 of the present invention. While not shown, the long-sized unit cell T can be repeatedly folded, to form the cell structure group M.

Figure 7:
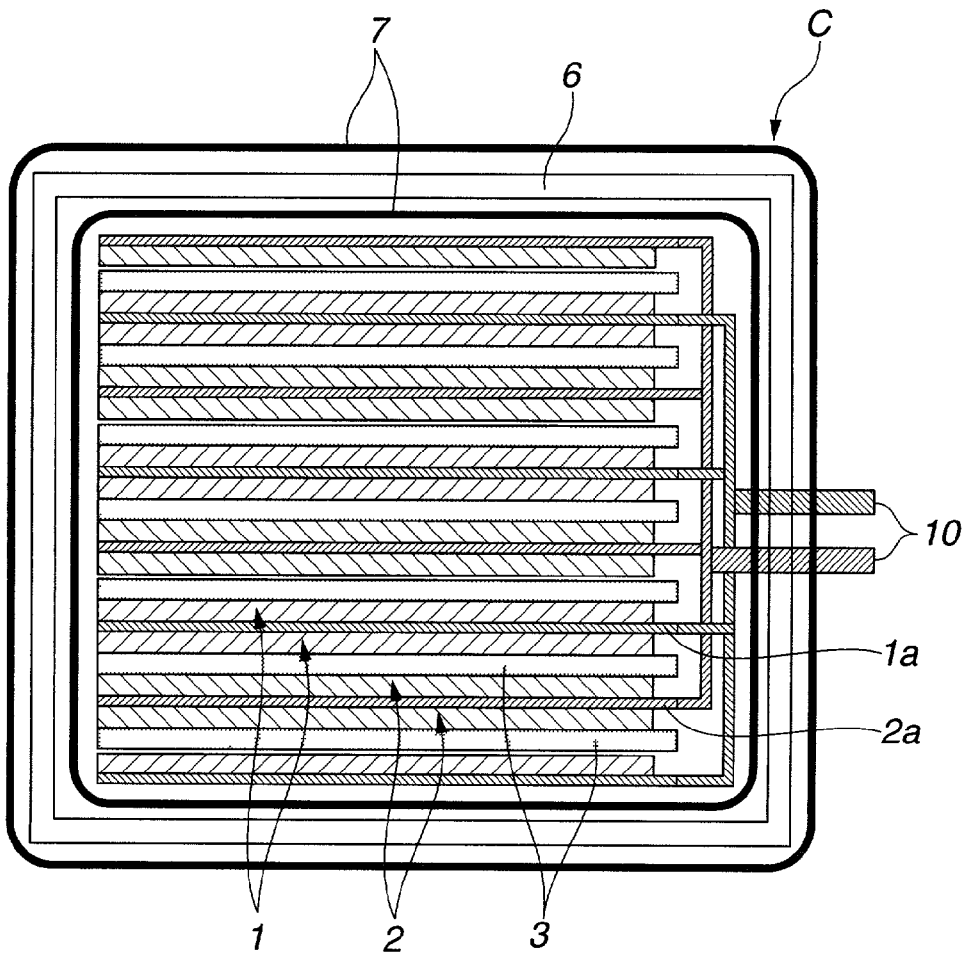
FIG. 7 is a schematic sectional view of a lithium based battery according to a combination of the first and second embodiments.

The second embodiment can be combined with the first embodiment as follows: namely, as shown in FIG. 7, the outer periphery of the cell structure group M is covered with the ion impermeable and extensible high polymer sheet 7 having a tensile elongation percentage of 1% or more, and further the outer peripheral surface of the battery container 6 is covered with the ion impermeable and extensible high polymer sheet 7 having a tensile elongation percentage of 1% or more, to thereby improve further the safety.

According to the lithium based battery of the second embodiment of the present invention, since the outer periphery of the cell structure group is covered with the extensible high polymer sheet, even if there happens an accident due to external causes, for example, even if a nail pierces the battery or the battery is crashed, the high polymer sheet is effectively deformed between the positive and negative electrodes, to prevent a large current from flowing between the electrodes, thereby preventing the battery from being instantly brought into a high temperature/high pressure state and thereby from being burst and/or ignited. Further, since the outer periphery of the cell structure group is covered with the extensible high polymer sheet, the cell structure group can be positively fixed.

While the second embodiment of the present invention has been described, the present invention is not limited thereto, and it is to be understood that various changes may be made without departing from the scope of the present invention.

Third Embodiment

Figure 8:
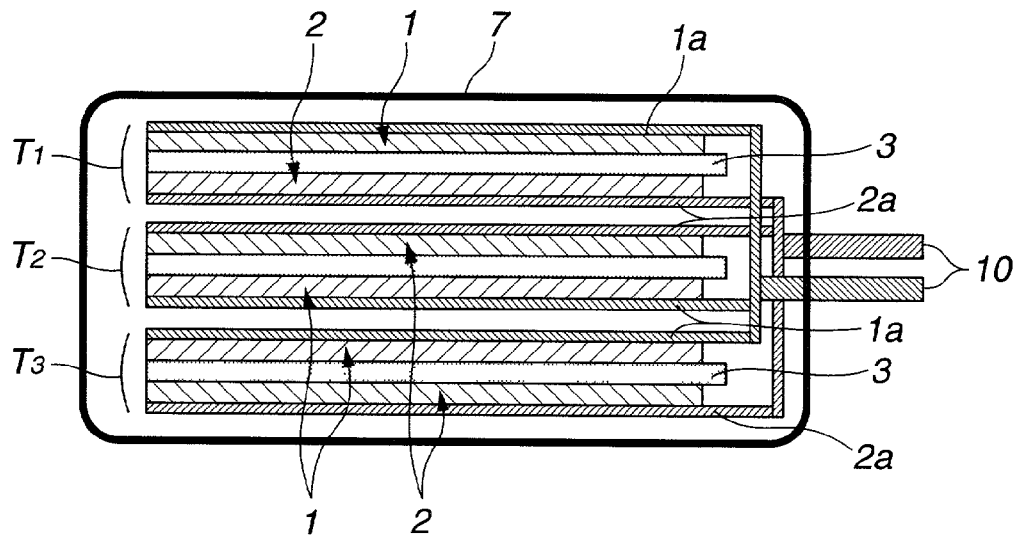
FIG. 8 is a schematic sectional view of a lithium based battery according to a third embodiment of the present invention.
Figure 9:
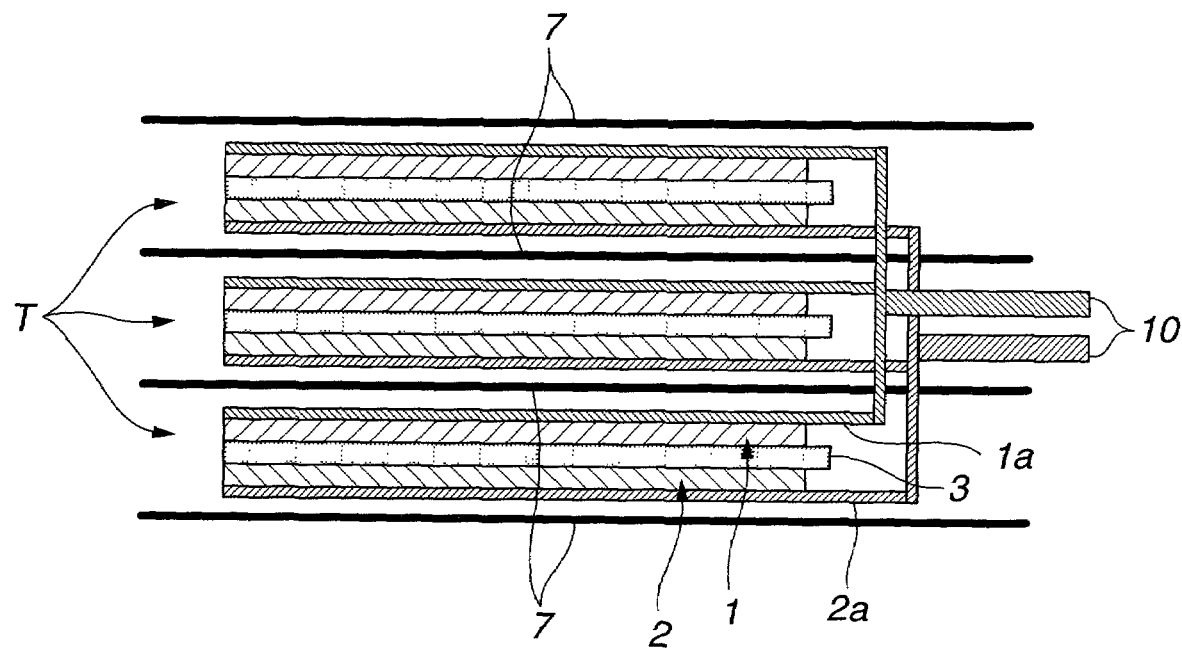
FIG. 9 us a schematic sectional view of another lithium based battery according to the third embodiment of the present invention.

FIGS. 8 and 9 are sectional views showing a lithium based battery according to a third embodiment of the present invention. The lithium based battery is configured such that a cell structure group formed by stacking three unit cells T each including a positive electrode 1, a negative electrode 2, and a separator 3 interposed therebetween is contained in a battery container (not shown), and the battery is filled with an electrolyte.

Figure 10:
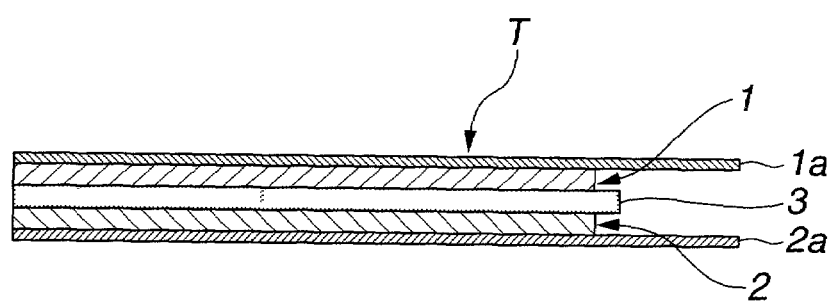
FIG. 10 is a schematic sectional view of one of unit cells of each of the batteries shown in FIGS. 8 and 9.

In this case, as shown in FIG. 10, the positive electrode 1 and the negative electrode 2 of the unit cell T are respectively formed on one surface of a positive collector 1a and one surface of a negative collector 2a in such a manner as to face to each other with the separator put therebetween. In other word, the positive and negative electrodes 1 and 2 of the unit cells T are disposed such that the positive electrodes 1 of the unit cells T are disposed back to back and similarly the negative electrodes 2 are disposed back to back. Further, as shown in FIG. 8, the outer peripheral surface of the cell structure group formed by stacking the unit cells $T_1$, $T_2$, and $T_3$ is covered with the ion impermeable and extensible high polymer sheet 7 having a tensile elongation percentage of 1% or more. Additionally, in FIG. 8, the unit cells $T_1$, $T_2$ and $T_3$ are disposed in such a manner that the same polarities are overlapped to each other (that is, the positive electrode 1 is not overlapped to the negative electrode 2).

Further, as shown in FIG. 9, the ion impermeable and extensible high polymer sheet 7 having a tensile elongation percentage of 1% or more can be disposed between adjacent two of the unit cells T and on the uppermost and lowermost surfaces of the cell structure group formed by stacking the unit cells.

In the third embodiment, the extensible high polymer sheet 7 may be the same as that in the first embodiment, and other parts be also the same as the corresponding parts in the first embodiment, and therefore, the parts are designated by the same reference numerals as those of the corresponding parts in the first embodiment and the overlapped description thereof is omitted.

Figure 11A:
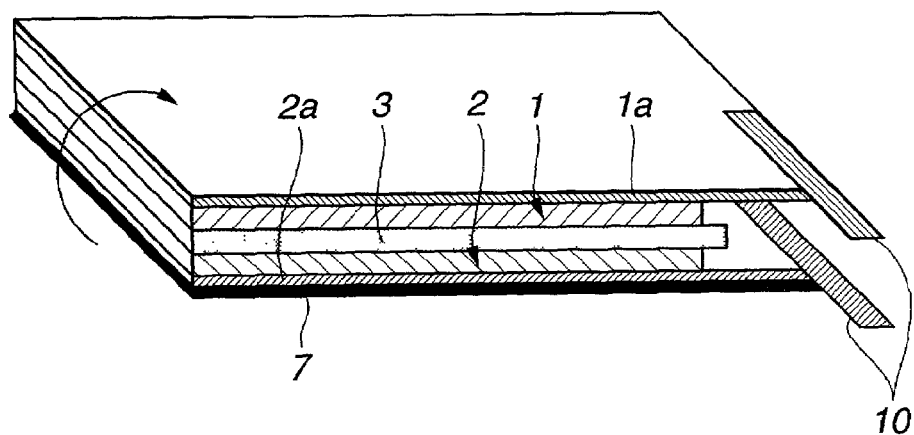
FIGS. 11A to 11C are perspective views of three wound-type lithium based batteries according to the third embodiment of the present invention.
Figure 11B:
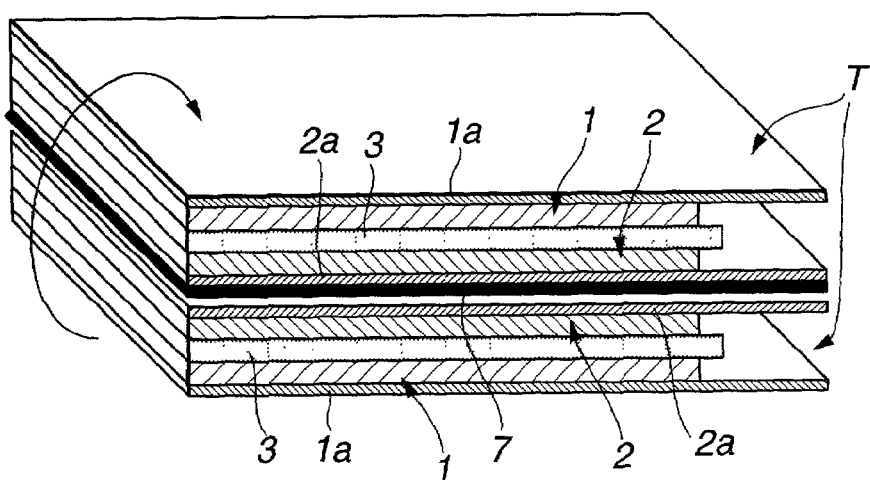
Figure 11C:
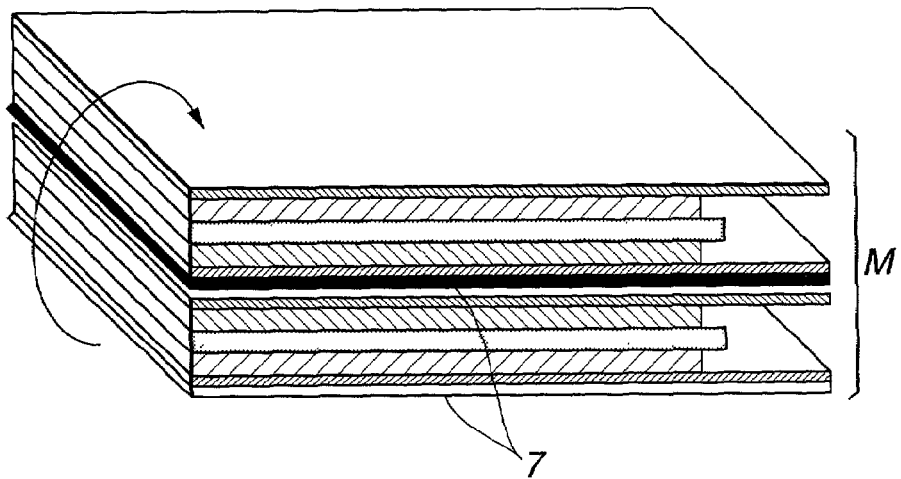

The lithium based battery in the third embodiment may be of a wound-type shown in FIGS. 11A to 11C, in which an integral body of the unit cells (that is, the long-sized unit cell) or the cell structure group may be wounded.

In the lithium based battery shown in FIG. 11A, the extensible high polymer sheet 7 is disposed on the back surface of the long-sized unit cell, and the long-sized unit cell is wound in the direction shown by an arrow in the figure. In this case, the extensible high polymer sheet may be disposed on the top surface of the long-sized unit cell, and the positional relationship between the positive electrode and the negative electrode may be reversed.

In the lithium based battery shown in FIG. 11B, the extensible high polymer sheet 7 is disposed between two pieces of the long-sized unit cells, and the long-sized unit cells are wound in the direction shown by an arrow in FIG. 11B. In this case, the long-sized unit cells T must be disposed in such a manner that the same polarities are overlapped to each other with the extensible high polymer sheet 7 put therebetween. The extensible high polymer sheets can be disposed on the uppermost surface and/or lowermost surface of the cell structure group formed by stacking the long-sized unit cells. In this case, the positive electrode and the negative electrode may be disposed in such a manner as to be overlapped to each other.

In the lithium based battery shown in FIG. 11C, the extensible high polymer sheets 7 are disposed between the long-sized unit cells and on the lowermost surface of the cell structure group M formed by stacking the long-sized unit cells, and the cell structure group M is wound in the direction shown by an arrow in the figure. In this case, the high polymer sheet may be disposed on the top surface of the cell structure group M. In addition, tabs are omitted in FIGS. 11B and 11C. The number of the stacked long-sized unit cells is not particularly limited but is generally in a range of 2 to 20. While not shown, the cell structure group formed by stacking the long-sized unit cells as described above can be of cource repeatedly folded.

The third embodiment can be combined with the first and second embodiments as follows: namely, the ion impermeable and extensible high polymer sheet having a tensile elongation percentage of 1% or more can be formed between unit cells and/or on the outer peripheral surface of each unit cell; the outer periphery of a cell structure group formed by stacking the unit cells or repeatedly folding or winding an integral body of the unit cells can be covered with the ion impermeable and extensible high polymer sheet having a tensile elongation percentage of 1% or more; and the outer peripheral surface of the battery container in which the cell structure group or unit cells has been contained can be covered with the ion impermeable and extensible high polymer sheet having a tensile elongation percentage of 1% or more. With this configuration, it is possible to further improve the safety of the lithium based battery.

According to the lithium based battery of the third embodiment, since the extensible high polymer is disposed between adjacent two of the unit cells and/or on the outer periphery surface of each unit cell (or the outer periphery of the cell structure group), even if there happens an accident due to external causes, for example, even if a nail pierces the battery or the battery is crashed, the high polymer is effectively deformed between the positive and negative electrodes, to prevent a large current from flowing between the electrodes, thereby preventing the battery from being instantly brought into a high temperature/high pressure state and thereby from being burst and/or ignited. Further, since the outer peripheral surface of each unit cell with the high polymer sheet, it is possible to positively fix each unit cell without occurrence of any deviation thereof from a reference position.

While the third embodiment of the present invention has been described, the present invention is not limited thereto, and it is to be understood that various changes may be made without departing from the scope of the present invention.

According to the lithium based battery of the present invention, since the battery includes the extensible high polymer sheet having a high tensile elongation percentage, even if there happens a severe accident due to external causes, for example, even if a nail pierces the battery or the battery is crashed, it is possible to positively prevent a large short-circuit current from flowing between the positive and negative electrodes, and hence to ensure a higher safety.

Figure 12:
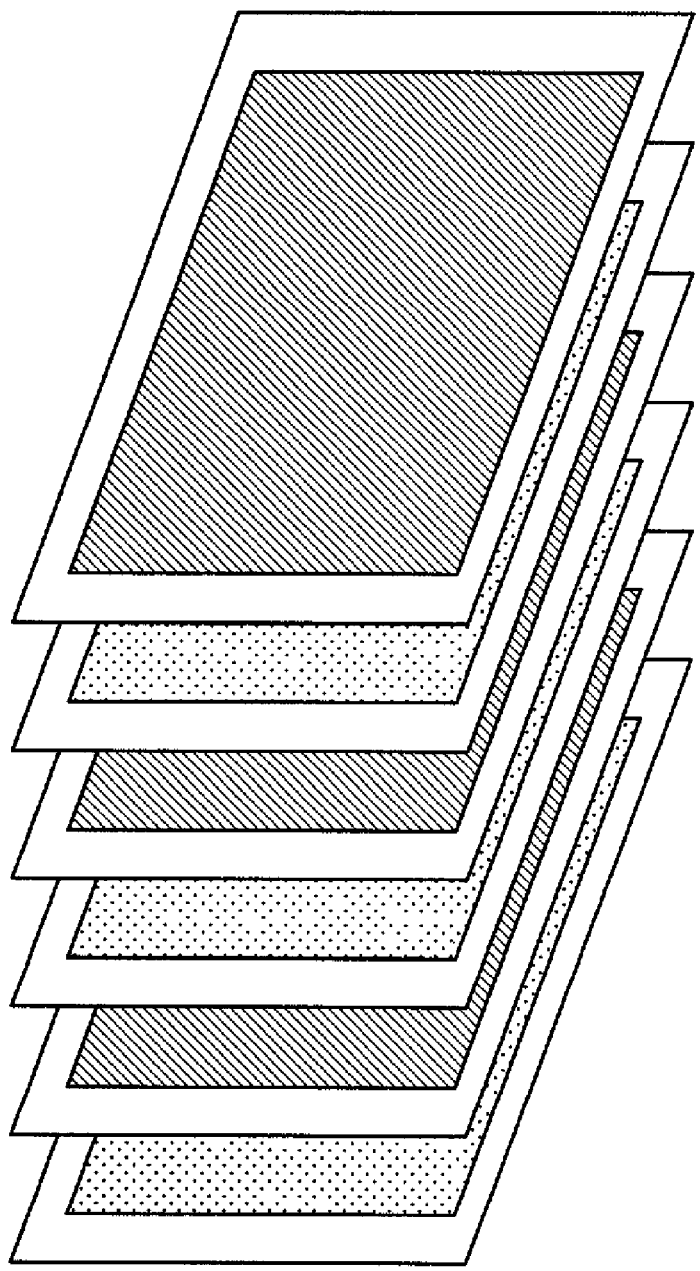
FIG. 12 is a perspective view of a stacked type battery.
Figure 13:
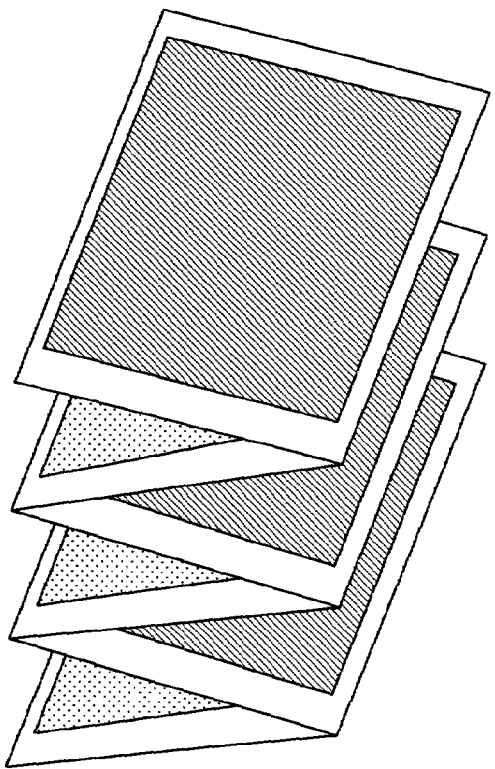
FIG. 13 is a perspective view of a folded type battery.
Figure 14:
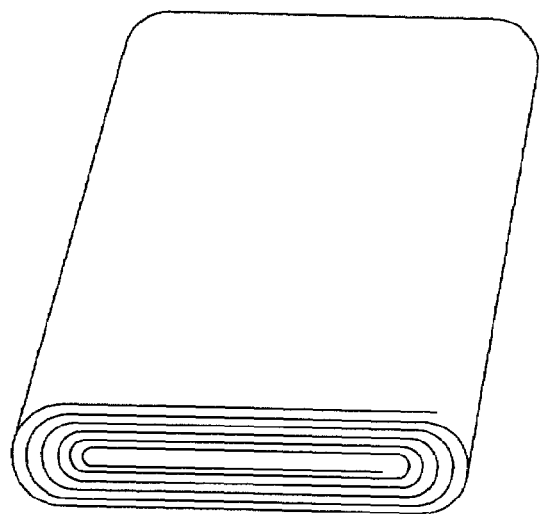
FIG. 14 is a perspective view of a wound-type battery.

The shape of the lithium based battery of the present invention is preferably configured as a stacked type as shown in FIG. 12; however, the present invention is not limited thereto. For example, the shape of the lithium based battery of the present invention can be also configured as a folded type as shown in FIG. 13, a wound type as shown in FIG. 14, and further, a coin type, a square type, a cylinder type having a spiral structure, or the like.

The lithium based battery of the present invention has, as described above, excellent characteristics such as a high safety, and therefore, it is suitably used for various applications, for example, an application of main power sources for portable terminals of video cameras, notebook type personal computers, portable telephones, PHSs, and the like, an application of backup power sources for memories, an application of power sources for instant power interruption of personal computers, an application of power sources for electric cars or hybrid cars, and an application of solar power generation energy storing systems used in combination of solar cells.

The invention claimed is:

1. A lithium based battery comprising a battery container containing therein:
   a cell structure group formed by stacking unit cells each including a positive electrode, a negative electrode, and a separator interposed therebetween, or formed by repeatedly folding or winding an integral body of said unit cells; and
   an electrolyte, which is poured in said battery container after said cell structure group is contained in said battery container,
   wherein said battery is characterized by the presence on the outer peripheral surface of said battery container of a covering that consists essentially of an ion impermeable and extensible high polymer sheet having a tensile elongation percentage of 1% or more, and
   wherein the tensile elongation of the battery container covering is selected to cause the sheet to provide insulation between the positive and negative electrodes of the battery when the container is deformed.

2. A lithium based battery according to claim 1, wherein the outer periphery of said cell structure group is covered with a sheet consisting essentially of an ion impermeable and extensible high polymer sheet having a tensile elongation percentage of 1% or more, the tensile elongation of the cell structure group cover sheet being selected to cause the sheet to provide insulation between positive and negative electrodes of the battery when the container is deformed.

3. A lithium based battery comprising a battery container containing therein:
   a cell structure group formed by stacking unit cells each including a positive electrode, a negative electrode, and a separator interposed therebetween, or formed by repeatedly folding or winding an integral body of said unit cells; and
   an electrolyte, which is poured in said battery container after said cell structure group is contained in said battery container,
   wherein said battery is characterized by the presence on the outer peripheral surface of said battery container of a covering that consists essentially of an ion impermeable and extensible high polymer sheet having a tensile elongation percentage of 1% or more,
   wherein the tensile elongation of the battery container covering is selected to cause the sheet to provide insulation between the positive and negative electrodes of the battery when the container is deformed, and
   wherein also the outer periphery of said cell structure group is covered with a sheet consisting essentially of an ion impermeable and extensible high polymer sheet having a tensile elongation percentage of 1% or more.

4. A lithium based battery according to claim 3, wherein said positive electrode and said negative electrode of each of said unit cells are respectively formed on one surface of a positive collector and one surface of a negative collector in such a manner as to face to each other with said separator put therebetween; and
   an ion impermeable and extensible high polymer sheet having a tensile elongation percentage of 1% or more is disposed between adjacent two of said unit cells and/or on the outer peripheral surface of each of said unit cells, the tensile elongation of said high polymer sheet being selected to cause the sheet to provide insulation between positive and negative electrodes of the battery when the container is deformed.

5. A lithium based battery according to claim 2, wherein said positive electrode and said negative electrode of each of said unit cells are respectively formed on one surface of a positive collector and one surface of a negative collector in such a manner as to face to each other with said separator put therebetween; and an ion impermeable and extensible high polymer sheet having a tensile elongation percentage of 1% or more is disposed between adjacent two of said unit cells and/or on the outer peripheral surface of each of said unit cells, the tensile elongation of said high polymer sheet being selected to cause the sheet to provide insulation between positive and negative electrodes of the battery when the container is deformed.

6. A lithium based battery according to claim 1, wherein said extensible high polymer sheet is made from at least one kind selected from a group consisting of a polyurethane based elastomer and a fluorine based elastomer.

7. A lithium based battery according to claim 3, wherein each of said high polymer sheets said extensible high polymer sheet is made from at least one kind selected from a group consisting of a polyurethane based elastomer and a fluorine based elastomer.

8. A lithium based battery according to any one of claims 1 to 7, wherein said extensible high polymer sheet has a tensile elongation percentage of 200% or more throughout the temperature range −20 to +80° C.

* * * * *